(12) United States Patent
Aldrich et al.

(10) Patent No.: US 7,328,230 B2
(45) Date of Patent: *Feb. 5, 2008

(54) SIMD FOUR-DATA ELEMENT AVERAGE INSTRUCTION

(75) Inventors: Bradley C. Aldrich, Austin, TX (US); Nigel C. Paver, Austin, TX (US); Jianwei Liu, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 694 days.

This patent is subject to a terminal disclaimer.

(21) Appl. No.: 10/814,990

(22) Filed: Mar. 26, 2004

(65) Prior Publication Data

US 2005/0216545 A1   Sep. 29, 2005

(51) Int. Cl.
*G06F 7/38* (2006.01)
(52) U.S. Cl. .................................... 708/445
(58) Field of Classification Search ................ 708/445
See application file for complete search history.

(56) References Cited

U.S. PATENT DOCUMENTS

| | | | | |
|---|---|---|---|---|
| 4,040,052 A | * | 8/1977 | Stanislaw | 708/445 |
| 5,260,975 A | * | 11/1993 | Saito | 375/327 |
| 5,710,732 A | * | 1/1998 | Wong | 708/445 |
| 5,818,532 A | * | 10/1998 | Malladi et al. | 375/240.03 |
| 5,844,541 A | * | 12/1998 | Cahill, III | 345/667 |
| 5,870,138 A | * | 2/1999 | Smith et al. | 348/143 |
| 5,917,739 A | * | 6/1999 | Wong | 708/445 |
| 6,078,941 A | * | 6/2000 | Jiang et al. | 708/625 |
| 2003/0097389 A1 | * | 5/2003 | Saulsbury et al. | 708/445 |
| 2003/0158881 A1 | | 8/2003 | Liao et al. | |

* cited by examiner

*Primary Examiner*—Tan V. Mai

(57) ABSTRACT

According to some embodiments, a Single-Instruction/Multiple-Data averaging operation is presented. The averaging operation averages multiple sets of data elements, for example, two data elements each from a first source and a second source, producing a set of averages. In at least one embodiment, in a first adder stage, a first plurality of data elements are added to a second plurality of data elements, generating a plurality of intermediate results. In a second adder stage, multiple different combinations of the plurality of intermediate results are added together, generating a plurality of sum results. The two least significant bits of each sum result are discarded.

8 Claims, 8 Drawing Sheets

SIMD FOUR-DATA ELEMENT AVERAGE INSTRUCTION

A portion of the disclosure of this patent document contains material that is subject to copyright protection. The copyright owner has no objection to the facsimile reproduction by anyone of the patent disclosure, as it appears in the Patent and Trademark office patent files or records, but otherwise reserves all copyright rights whatsoever.

BACKGROUND

Description of the Related Art

Many processing techniques, for example, image and video processing, include operations in which a number of values are averaged. These averaging operations may be used, for example, in image filtering, correlation, and estimation where pixel values of a number of neighboring pixels are averaged. The averaging may also be performed on the pixel values corresponding to the same pixel at different times, for example, between frames. These averaging operations may be computationally intensive.

In order to support the computational load and data throughput requirements associated with performing a large number of averaging operations, processors used for image and video processing may introduce SIMD (Single-Instruction/Multiple-Data) operations. In SIMD operations, a single instruction is sent to a number of processing elements that perform the same operation on different data.

Some processors provide dedicated hardware to perform an averaging operation. For example, a dedicated 40-bit SIMD adder may be used to perform four addition and averaging operations on four sets of pixel values simultaneously to produce four 8-bit pixel average values. This 40-bit SIMD adder includes two dummy bits for each byte. One dummy bit controls the blocking or propagation of carries from an addition operation, and the other dummy bit controls a shifting operation. Large dedicated adders are undesirable because they consume large silicon areas and may not be re-usable by other functions.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

Figure 1:
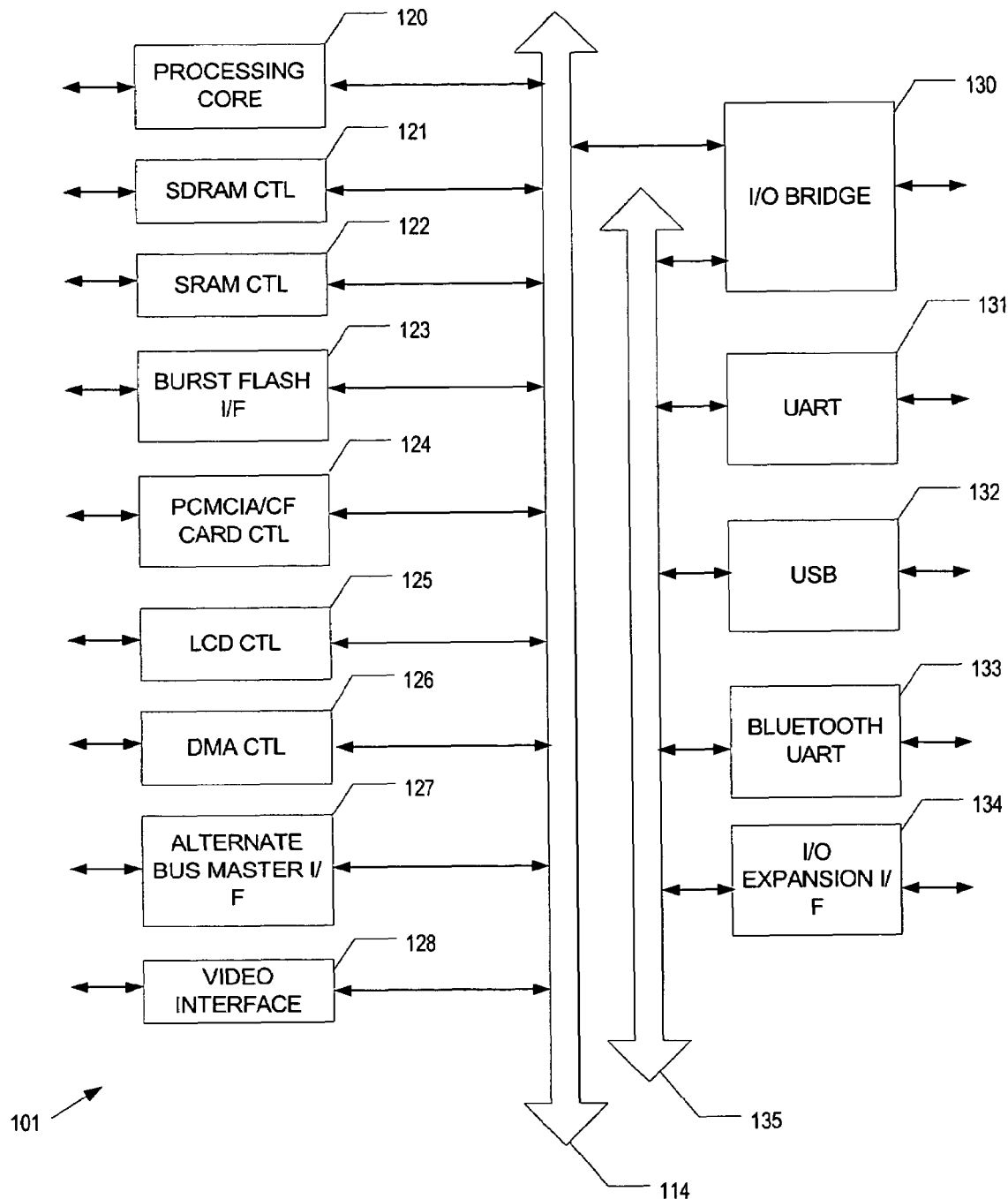
FIG. 1 illustrates a data processing system capable of executing a four-data element averaging SIMD instruction according to an embodiment of the present invention.

According to some embodiments, a Single-Instruction/Multiple-Data averaging operation is presented. The averaging operation averages multiple sets of data elements, for example, two data elements each from a first source and a second source, producing a set of averages. In at least one embodiment, in a first adder stage, a first plurality of data elements are added to a second plurality of data elements, generating a plurality of intermediate results. In a second adder stage, multiple different combinations of the plurality of intermediate results are added together, generating a plurality of sum results. The two least significant bits of each sum result are discarded.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," and the like, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may include one or more processors.

A data processing device or system may be understood to mean any one of a variety of devices or systems for accessing data and/or communications. Examples include but are not limited to any combinations of one or more of the following: laptop computers, notebook computers; desktop computers, personal digital assistants, handheld computers, personal organizers; palmtop computers, pocket computers, cellular telephone/fax devices, game computers, digitizing tablet devices, electronic books, or digital audio recorder/players.

A register is any device capable of storing and providing data. Further functionality of a register with respect to data formats is described below. A register is not necessarily included on the same die or in the same package as the processor.

A wireless device or interface may be understood to mean any one of a variety of devices or interfaces for wireless communications. Examples include but are not limited to any combination of devices for one or more of the following: short-range radio, satellite communications, wireless local area networks, wireless telephony, cellular digital packet data, home radio frequency, narrowband time-division multiple access, code-division multiple access, wideband code-division multiple access, wireless fidelity or short message service.

It will be appreciated that the invention may be modified in arrangement and detail by those skilled in the art without departing from the principles of the present invention within the scope of the accompanying claims and their equivalents.

FIG. 1 illustrates a data processing system 101 capable of executing a four-data element averaging SIMD instruction according to an embodiment of the present invention. One embodiment of data processing system 101 includes an Intel® Personal Internet Client Architecture (Intel® PCA) applications processor with Intel XScale™ technology and ARM compatible core.

Data processing system 101 may include a processing core 120 capable of performing SIMD operations and, in particular, a four-data element averaging SIMD instruction. Processing core 120 is coupled with a bus 114 for communicating with various other system devices, which may include but are not limited to, for example, a synchronous dynamic random access memory (SDRAM) controller 121, a static random access memory (SRAM) controller 122, a burst flash memory interface 123, a personal computer memory card international association (PCMCIA)/compact flash (CF) card controller 124, a liquid crystal display (LCD) controller 125, a direct memory access (DMA) controller 126, an alternative bus master interface 127, and a video interface 128.

In one embodiment, data processing system 101 may also comprise an I/O bridge 130 for communicating with various I/O devices via an I/O bus 135. Such I/O devices may include but are not limited to, for example, a universal asynchronous receiver/transmitter (UART) 131, a universal serial bus (USB) 132, a Bluetooth wireless UART 133, and an I/O expansion interface 134.

One embodiment of data processing system 101 provides for mobile, network and/or wireless communications and a processing core 120 capable of performing SIMD operations and in particular, a four-data element averaging SIMD instruction. Processing core 120 may be programmed with various audio, video, imaging and communications algorithms. It will be appreciated that these algorithms may include digital signal processing (DSP) building blocks, which may benefit from SIMD operations, such as: convolutions; auto-correlation functions (ACF) or cross-correlation functions (CCF); digital filters such as finite impulse response filters (FIR), adaptive filters (AF) which include, for example, least mean squared (LMS) error algorithms for echo cancellation, or infinite impulse response filters (IIR); discrete transformations such as a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 2:
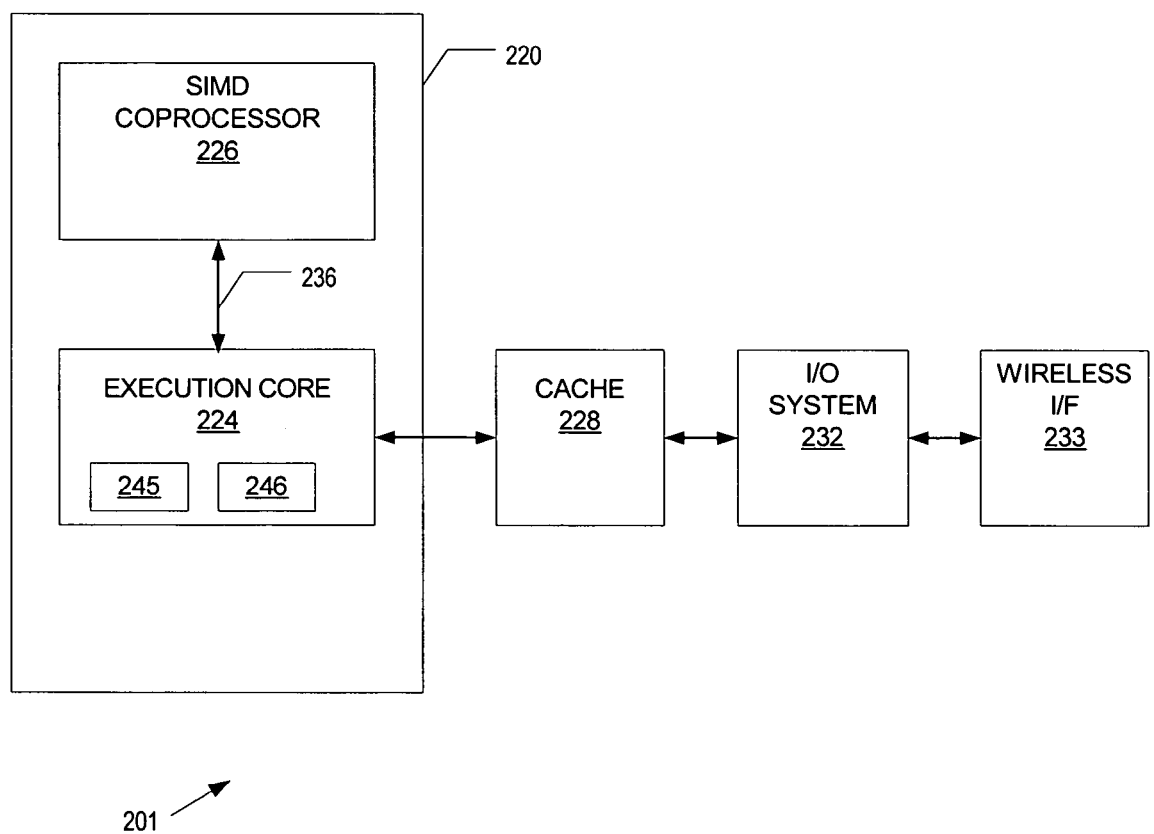
FIG. 2 illustrates an alternative embodiment of a data processing system capable of executing a four-data element averaging SIMD instruction according to an embodiment of the present invention.

FIG. 2 illustrates an alternative embodiment of a data processing system capable of executing a four-data element averaging SIMD instruction. A data processing system 201 may include a processing core 220 having an execution core 224 and a SIMD coprocessor 226. Processing core 220 may communicate with a cache memory 228 and an input/output system 232. The input/output system 232 may optionally be coupled to a wireless interface 233. SIMD coprocessor 226 is capable of performing SIMD operations, in particular, a four-data element averaging SIMD instruction.

In operation, execution core 224 executes a stream of data processing instructions that control data processing operations of a general type including interactions with the cache memory 228, and input/output system 232. Embedded within the stream of data processing instructions are coprocessor instructions. Execution core 224 recognizes these coprocessor instructions as being of a type that should be executed by SIMD coprocessor 226. Accordingly, execution core 224 issues these coprocessor instructions on coprocessor bus 236 from where they are received by any attached coprocessors.

Data may be received via wireless interface 233 for processing by the coprocessor instructions. For one example, voice communication may be received in the form of a digital signal, which may be processed by the coprocessor instructions to regenerate digital audio samples representative of the voice communications. For another example, compressed audio and/or video may be received in the form of a digital bit stream, which may be processed by the coprocessor instructions to regenerate digital audio samples and/or motion video frames.

For one embodiment of processing core 220, instructions may be conditionally executed. Conditionally executed instructions include instructions that have an associated condition that is checked by determining, for example, if flags 245 and 246 match the condition associated with the instruction.

Processing core 120 of FIG. 1 and/or processing core 220 of FIG. 2 may represent central processing units of any type of architecture, including ARM, CISC or RISC type architectures. While one embodiment is described in which the invention is implemented in a single processor computing system, other embodiments of the invention could be implemented in a multi-processor computing system.

Figure 3:
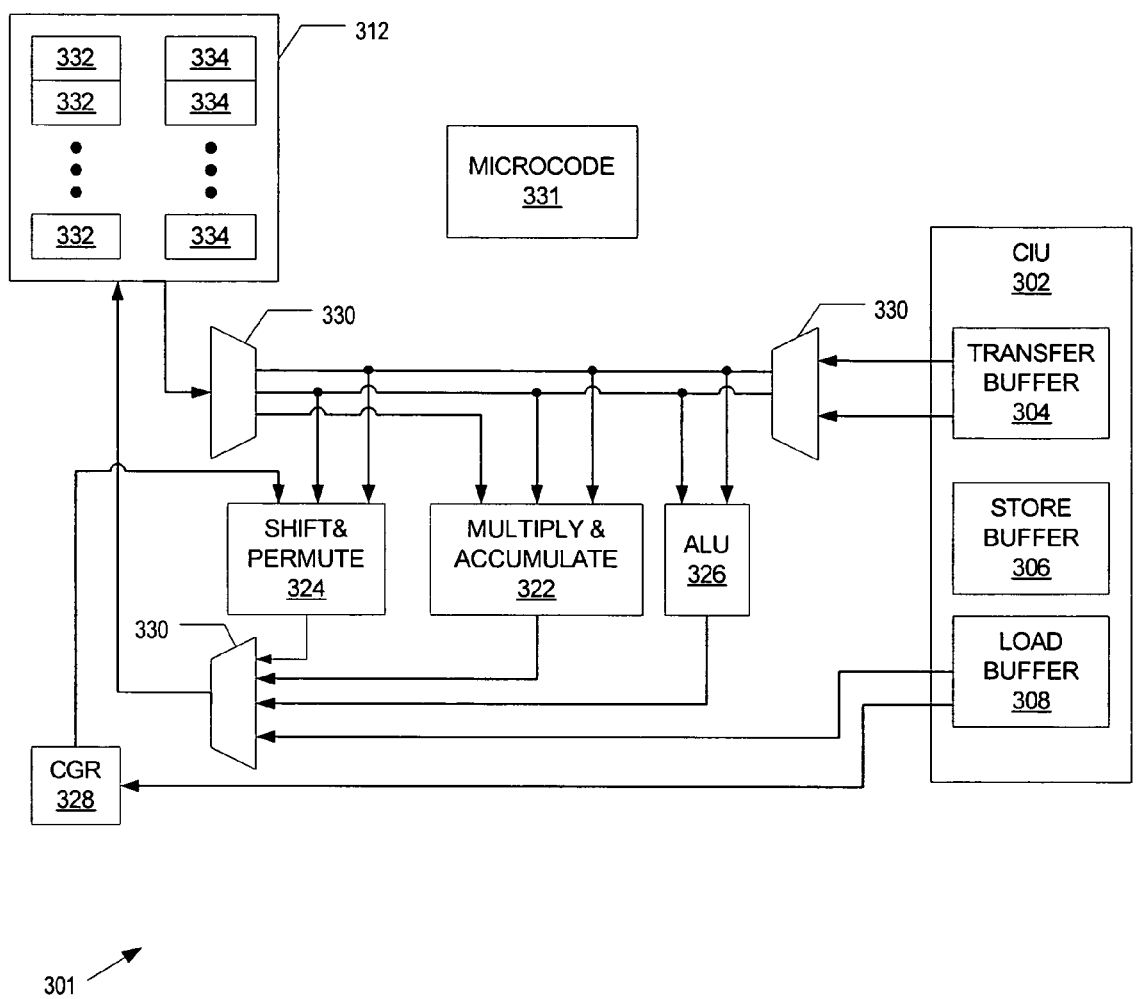
FIG. 3 illustrates a SIMD coprocessor according to an embodiment of the present invention.

FIG. 3 illustrates a SIMD coprocessor according to an embodiment of the present invention. SIMD coprocessor 301 may include a coprocessor interface unit (CIU) 302 including a transfer buffer 304, a store buffer 306 and a load buffer 308. Transfer buffer 304 may facilitate transfers to and from coprocessor register file 312. In one embodiment, as shown, CIU 302 may detect and/or identify coprocessor instructions intended for SIMD coprocessor 301. CIU 302 facilitates communication between an execution core, for example, execution core 224, and coprocessor 301. CIU 302 additionally communicates with a multiply accumulate unit 322, a shift and permute unit 324, and an arithmetic logic unit (ALU) 326. A control general purpose register (CGR) 328 contains auxiliary registers. A plurality of multiplexers 330 facilitate the data transfer between various units. A microcode unit 331 controls data transfers and processing.

Coprocessor register file 312 may include a plurality of registers. One embodiment of coprocessor register file 312 includes sixteen data registers 332 and eight status and control registers 334. In one alternative embodiment of coprocessor register file 312, the data registers 332 include 64 bits of data and status and control registers 334 include 32 bits of data. In another alternative embodiment of coprocessor register file 312, data registers 332 include 128 bits of data providing for wide SIMD operations and status and control registers 334 include 64 or more bits of data.

In one embodiment of coprocessor 301, up to three registers may be assigned for each instruction. For example, up to two source registers and one destination register may be assigned or implicit to an instruction. Alternatively, three source registers may be assigned where the destination register acts also as a source register. A primary source register may be designated wRn, a secondary source register may be designated wRm, and a destination register may be designated wRd in accordance with one embodiment of coprocessor 301.

The four-data element averaging SIMD instruction may be performed on, for example, pixel values of four neighboring pixels and/or the pixel values of the same pixel at different times, for example, between frames. The SIMD instruction may treat the pixel values (operands) as packed 8-bit (byte) values.

The SIMD instruction may be implemented using the following format:

WAVG4{R}{Cond}wRd, wRn, wRm where R and Cond are qualifiers, wRn and wRm are source registers and wRd is a destination register. R is a rounding value, which may be set to a value of 1 or 0. If R is present, a value of two is added to the sum prior to the precision reduction which defines the averaging operation. If R is not present, a value of one is added to the sum. Cond is an execution condition. If the condition is not true, then the instruction is not executed. The values of wRm, wRn, and wRd may be treated as unsigned, packed 8-bit data.

A four-data element averaging operation may be carried out as follows:

If (Cond specified is true) then
Round=(R Specified)?:1:0;
wRd[byte 7]=0;
wRd[byte 6]=(wRn[byte 7]+wRm[byte 7]+wRn[byte 6]+wRm[byte 6]+1+Round)>>2;
wRd[byte 5]=(wRn[byte 6]+wRm[byte 6]+wRn[byte 5]+wRm[byte 5]+1+Round)>>2;
wRd[byte 4]=(wRn[byte 5]+wRm[byte 5]+wRn[byte 4]+wRm[byte 4]+1+Round)>>2;
wRd[byte 3]=(wRn[byte 4]+wRm[byte 4]+wRn[byte 3]+wRm[byte 3]+1+Round)>>2;
wRd[byte 2]=(wRn[byte 3]+wRm[byte 3]+wRn[byte 2]+wRm[byte 2]+1+Round)>>2;
wRd[byte 1]=(wRn[byte 2]+wRm[byte 2]+wRn[byte 1]+wRm[byte 1]+1+Round)>>2;
wRd[byte 0]=(wRn[byte 1]+wRm[byte 1]+wRn[byte 0]+wRm[byte 0]+1+Round)>>2;

where ">>2" indicates that the result of the additional operation is shifted right by two bits.

Figure 4:
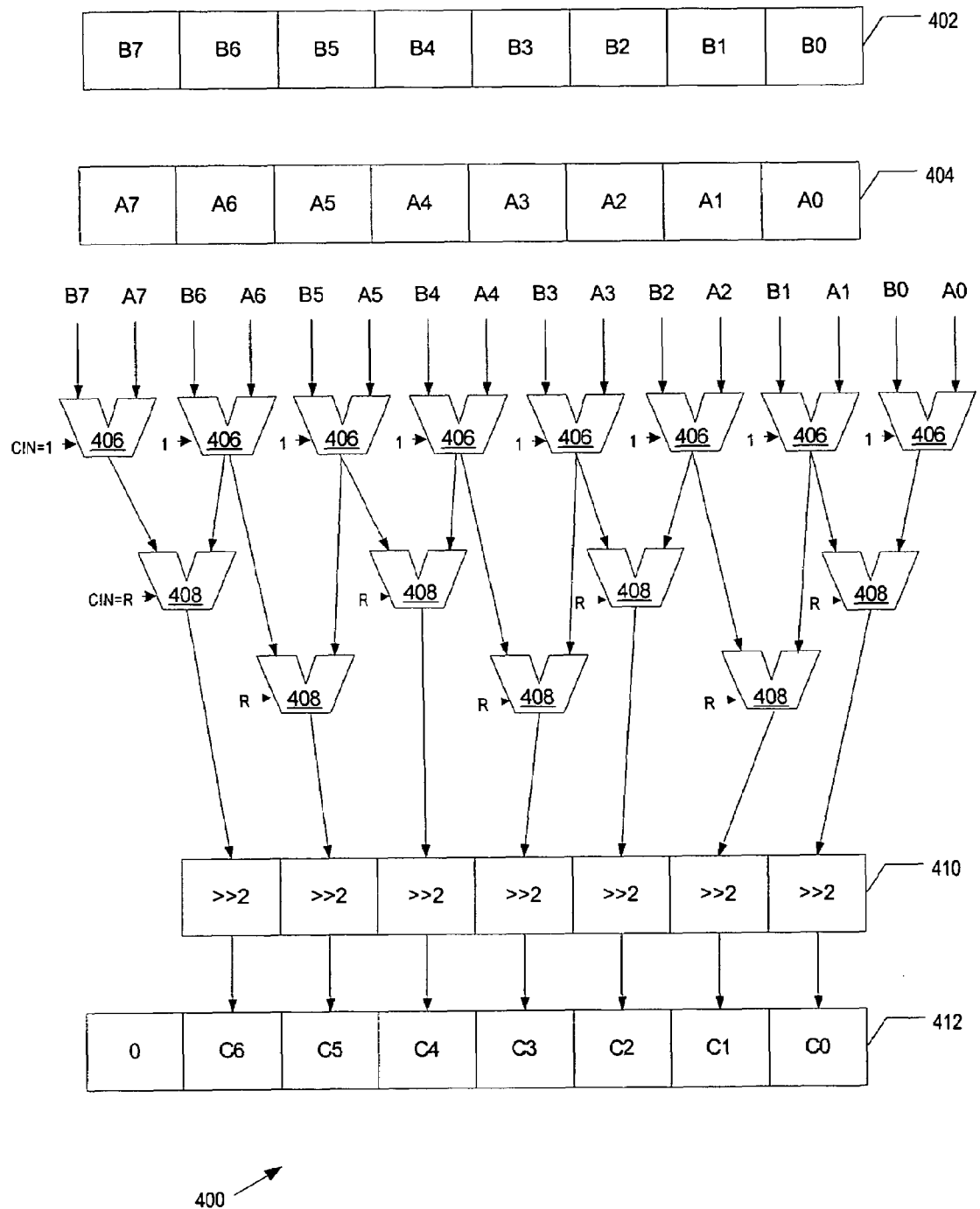
FIG. 4 illustrates a function unit for performing a four-data element averaging SIMD instruction according to an embodiment of the present invention.

FIG. 4 illustrates a functional unit 400 for performing a four-data element averaging SIMD (Single-Instruction/Multiple-Data) instruction according to an embodiment of the present invention. The functional unit 400 may be implemented in a processor, for example, processing core 120, processing core 220, a general purpose processor, a digital signal processor (DSP), or an application specific integrated circuit (ASIC) processor.

A set of eight operands, wRn[byte 0] to wRn[byte 7], shown as B0 to B7, are stored in a wRn register 402. Another set of eight operands, wRm[byte 0] to wRm[byte 7], shown as A0 to A7, are stored in a wRm register 404. These source operands may be, for example, portions of two rows of video data for storing pixels in a video image. The four-data element averaging instruction may average four adjacent pixels and may be used in, for example, video encoding, video decoding, image downscaling, and color conversion functions.

As illustrated in FIG. 4, eight eight-bit adders 406 each add two eight-bit data elements, wRm[byte i]+wRn[byte i]. The "carry in" of each of adders 406 is set to a value of one. The outputs of adders 406 are added by seven nine-bit adders 408 forming seven ten-bit results (wRm[byte i]+wRn[Byte i]+wRm[byte (i+1)]+wRn[byte (i+1)]) for i=0 to 6. The carry in of each of adders 408 is set according to the rounding value R specified in the instruction, either a value of one or a value of zero. Average values, shown as C0 to C6 and stored in a wRd register 412, are produced by dividing each 10-bit output of adders 408 by four. In binary division, dividing a number by four may be accomplished by shifting the result right by two bit positions utilizing shift logics 410. Shift logics 410 may be intermediate storage locations capable of shifting bit locations. Alternatively, shift logics 410 may be wires routed, with or without intermediate storage, to destination register wRd 412, discarding the two least significant bits (LSBs) of the result.

In one embodiment of the present invention, the use of adders 406 and 408 are controlled by microcode or decode logic and may be used by other instructions. This embodiment allows reuse of existing circuitry providing adders, registers and the like to be efficiently reused by other instructions.

Although packed 8-bit operands and results have been described, the functional unit 400 and the averaging instruction may operate on other data sizes (for example, 16-bit and 32-bit operands) by selecting component functional units and data paths layouts that accommodate the different data size. Also, SIMD instructions that operate on data multiples other than four, as described above in connection with functional unit 400, may also be implemented by selecting component functional units and data path layouts that accommodate the different data multiples.

Figure 5:
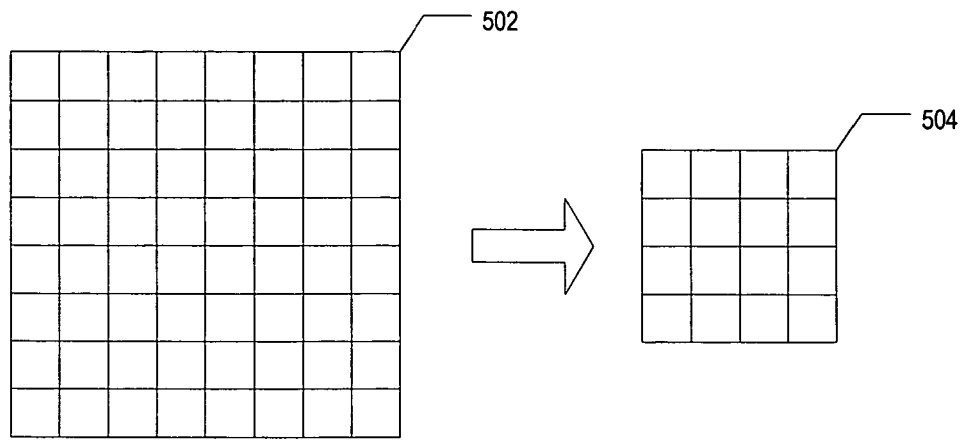
FIG. 5 illustrates a pictorial representation of an image downscaling operation according to an embodiment of the present invention.

As mentioned above, data element averaging can be used in a variety of applications, for example, image processing. FIG. 5 illustrates a pictorial representation of an image downscaling operation according to an embodiment of the present invention. An eight-pixel-by-eight pixel-image block 502 is downscaled to a four-pixel-by-four-pixel image unit 504. Simple methods of downscaling such as discarding every other pixel results in poor image quality and artifacts (also referred to as aliasing).

In order to minimize the degradation in image quality when resizing an image, a number of image processing algorithms may be applied prior to the decimation. These algorithms are often based on a two dimensional (2D) convolution of an image. To convolve an image, a 2D filter kernel of finite dimensions is aligned with an equal sized subset of the image and then scanned across the image in multiple steps. At each step in the convolution a different group of pixels are aligned with the kernel. Each of the corresponding overlapping elements is multiplied with the elements of the kernel. The resulting products of the element multiplications are accumulated, scaled if necessary, and then stored to an output image array. The convolution operation can be written as the finite sum in the following equation:

$$c(m, n) = \sum_{j=0}^{N-1} \sum_{k=0}^{M-1} a(j, k) \cdot h(m - j, n - k)$$

According to one use of the present invention, a 2:1 downscaling is performed by first convolving the image with a 2×2 "box" filter, and then down sampling:

$$h_{3 \times 3}[j, k] = \frac{1}{4} \begin{bmatrix} 1 & 1 \\ 1 & 1 \end{bmatrix}.$$

Figure 6:
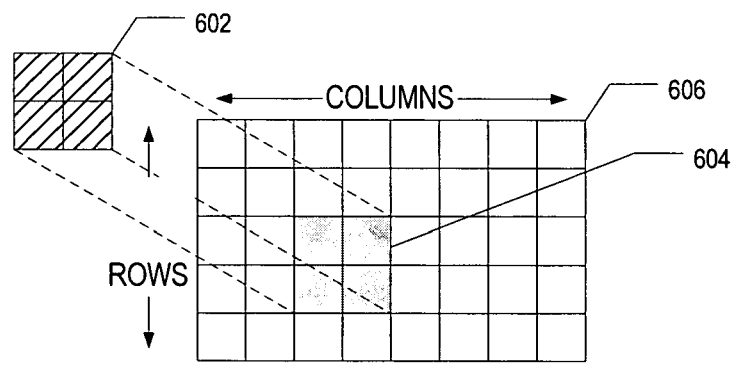
FIG. 6 illustrates an example of an image convolution according to an embodiment of the present invention.
Figure 7:
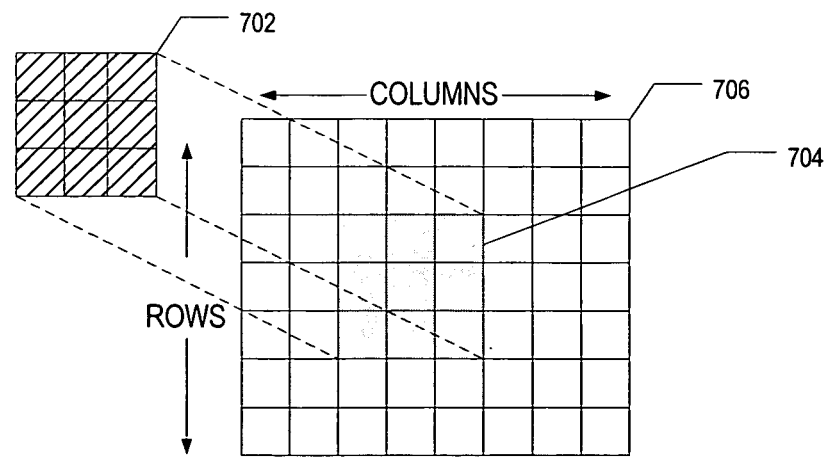
FIG. 7 illustrates another example of an image convolution according to an embodiment of the present invention.

FIG. 6 illustrates an example of an image convolution according to an embodiment of the present invention. A 2×2 filter kernel 602 is aligned with an equal sized pixel subset 604 of image 606. FIG. 7 illustrates another example of an image convolution according to an embodiment of the present invention. A 3×3 filter kernel 702 is aligned with an equal sized pixel subset 704 of image 706.

The averaging of multiple pixels using four-data element averaging SIMD instruction and a pack instruction as illustrated with the following code sequence.

destination register 806 is ANDed (WAND) with 0x00FF00FF00FF00FFh and the results stored in register 808. Thus, register 808 contains only the even averages C6, C4, C2 and C0. Another data element averaging operation is applied to two other source registers 812 and 814. Register 812 contains eight eight-bit data elements P8 to P15. Register 814 contains eight eight-bit data elements N8 to N15. Destination register 816 contains the averaging results, seven eight-bit data elements C8 to C14. The contents of destination register 816 is ANDed (WAND) with 0x00FF00FF00FF00FFh and the results stored in register 818. Thus, register 818 contains only the even averages C14, C12, C10 and C8. The contents of register 808 and register 818 are packed into a single register 822, containing C0, C2, C4, C6, C8, C10, C12, and C14.

Note that although separate registers are illustrated for each data element averaging operation, alternate embodiments may reuse source and/or destination registers for multiple operations.

For kernels larger than the 2×2 the quality can be improved significantly. The total number of operations required to perform 2D convolution is high. With an image that is N×N in size and a kernel that is K×K, the total number of multiply and add operations is $N^2K^2$. In many cases it is possible to develop a more efficient implementation if the filter can be decomposed into a row and column filter.

```
@ 2D Image 2:1 Down sample Routine Box Filter:, Assumes data is in range 0-254
@ Input/Output::
@     Input Image - M×N Dimensions
@        r0 → Pointer to row K of aligned image plane
@        r1 → Pointer to row K+1
@     Output Image - M/2×N/2 Dimensions
@        r2 → Pointer to output image
        mov       r5, #M              @ Setup Outer Loop Count
        mov       r6, #0x00FF         @ Setup mask 0x00FF
        tbcsth    wR15 ,r6            @ Setup mask 0x00FF00FF00FF00FF
Outer_loop:
        wldrd     wR0, [r0], #8       @ load eight pixels from image ROW(N)
        wldrd     wR1, [r1], #8       @ load eight pixels from image ROW(N+1)
        mov       r4, #N              @ Setup Inner Loop Count
Inner_loop1:
        wavg4r    wR2,wR1,wR0         @ Average seven groups of four pixels
        wldrd     wR0, [r0], #8       @ load next 8 pixels from image ROW(N)
        wldrd     wR1, [r1], #8       @ load next 8 pixels from image ROW(N+1)
        wavg4r    wR3, wR1, wR0       @ Average seven groups of four pixels
        wand      wR2, wR2, wR15      @ mask off the odd averages
        wand      wR3, wR3, wR15      @ mask off the odd averages
        wpackus   wR4, wR2, wR3       @ Pack and decimate
        wstrd     wR4, [r2], #8       @ Store subsampled data
        wldrd     wR0, [r0], #8       @ Load next 8 pixels from image ROW(N)
        wldrd     wR1, [r1], #8       @ load next 8 pixels from image ROW(N+1)
        subs      r4, r4, #8          @ decrement loop count
        bne       inner_loop          @ decrement row count
        subs      r5,r5, #1
        bne       outer_loop
```

Figure 8:
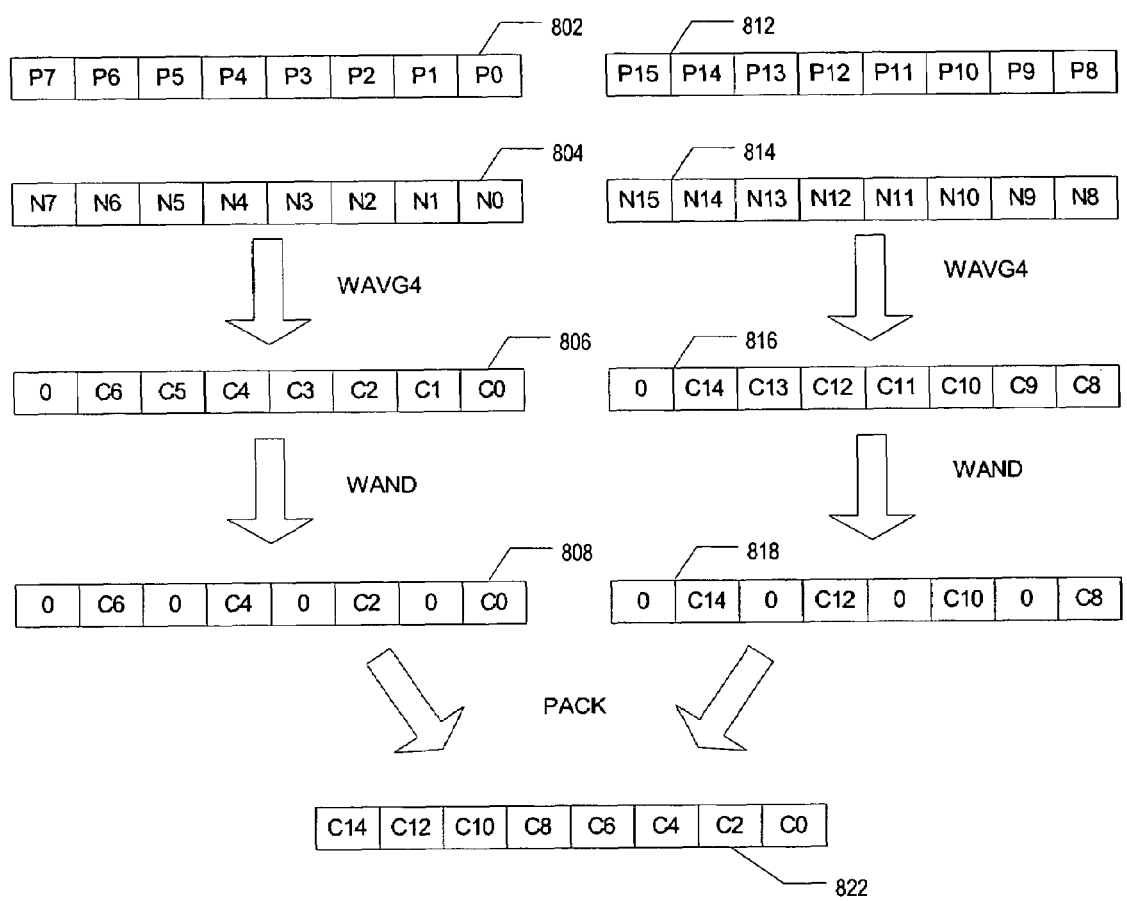
FIG. 8 illustrates a flow diagram of an image downscaling operation according to an embodiment of the present invention.

FIG. 8 illustrates a flow diagram of an image downscaling operation according to an embodiment of the present invention. Referring to the code above and FIG. 8, 32 pixels are reduced to 8 pixels. A data element averaging operation (WAVG4) is applied to two source registers 802 and 804. Register 802 contains eight eight-bit data elements P0 to P7. Register 804 contains eight eight-bit data elements N0 to N7. Destination register 806 contains the averaging results, seven eight-bit data elements C0 to C6. The contents of $$c(m, n) = \sum_{j=0}^{N-1} \left\{ \sum_{k=0}^{M-1} a(m - j, n - k) \cdot h_{row}(k) \right\} h_{column}(k)$$

Thus, it is possible to apply two one-dimensional filters, first along the rows and then along the columns. This reduces the total number of operations to a total of $N^2K$. The (1,2,1) and low-pass filters display the property of separability.

$$h_{3\times3}[j,k] = \frac{1}{16}\begin{bmatrix} 1 & 2 & 1 \\ 2 & 4 & 2 \\ 1 & 2 & 1 \end{bmatrix},$$

and in general most linear filters are separable. The equivalent kernel for these filters can be implemented by a row and column filtering operation:

$$h_{3\times3}[j,k] = hcol[j] \otimes hrow[k] = \begin{bmatrix} 1 \\ 2 \\ 1 \end{bmatrix} \otimes \begin{bmatrix} 1 & 2 & 2 \end{bmatrix} = \begin{bmatrix} 1 & 2 & 1 \\ 2 & 4 & 2 \\ 1 & 2 & 1 \end{bmatrix}.$$

The equivalent kernel for these filters can be implemented by a row and column filtering operation with a separate image transpose operation between applications of the (1,2, 1) filter.

Input Image→Row Filter (1,2,1)
 →Transpose→Column Filter(1,2,1)
 →Transpose→Output Image The resolution of the image changes as follows by applying this sequence.

N×M→N×M/2→M/2×N→M/2×N/2→N/2×M/2

The averaging of multiple pixels using four-data element averaging SIMD instruction and a pack instruction as illustrated with the following code sequence.

arrangement aligns the pixels for a 2D convolution. A data element averaging operation (WAVG4) is applied to the registers 906 and 908. Destination register 910 contains the averaging results, seven eight-bit data elements C0 to C6. The contents of destination register 910 is ANDed (WAND) with 0x00FF00FF00FF00FFh and the results stored in register 912. Thus, register 912 contains only the even averages C0, C2, C4, and C6. Register 922 contains a first set of pixels, P15-P8. Register 924 contains a second set of pixels, P23-P16. The pixels stored in registers 922 and 924 are aligned with an align operation (WALIGNI), resulting in pixels P16-P9 stored in register 926 and pixels P15-P8 stored in a register 928. Note that this arrangement aligns the pixels for a 2D convolution. A data element averaging operation (WAVG4) is applied to the registers 926 and 928. Destination register 930 contains the averaging results, seven eight-bit data elements C8 to C14. The contents of destination register 930 is ANDed (WAND) with 0x00FF00FF00FF00FFh and the results stored in register 932. Thus, register 932 contains only the even averages C8, C10, C12 and C14. The contents of register 912 and register 932 are packed into a single register 942, containing C0, C2, C4, C6, C8, C10, C12, and C14.

Note that although separate registers are illustrated for each data element averaging operation, alternate embodiments may reuse source and/or destination registers for multiple operations.

Figure 10:
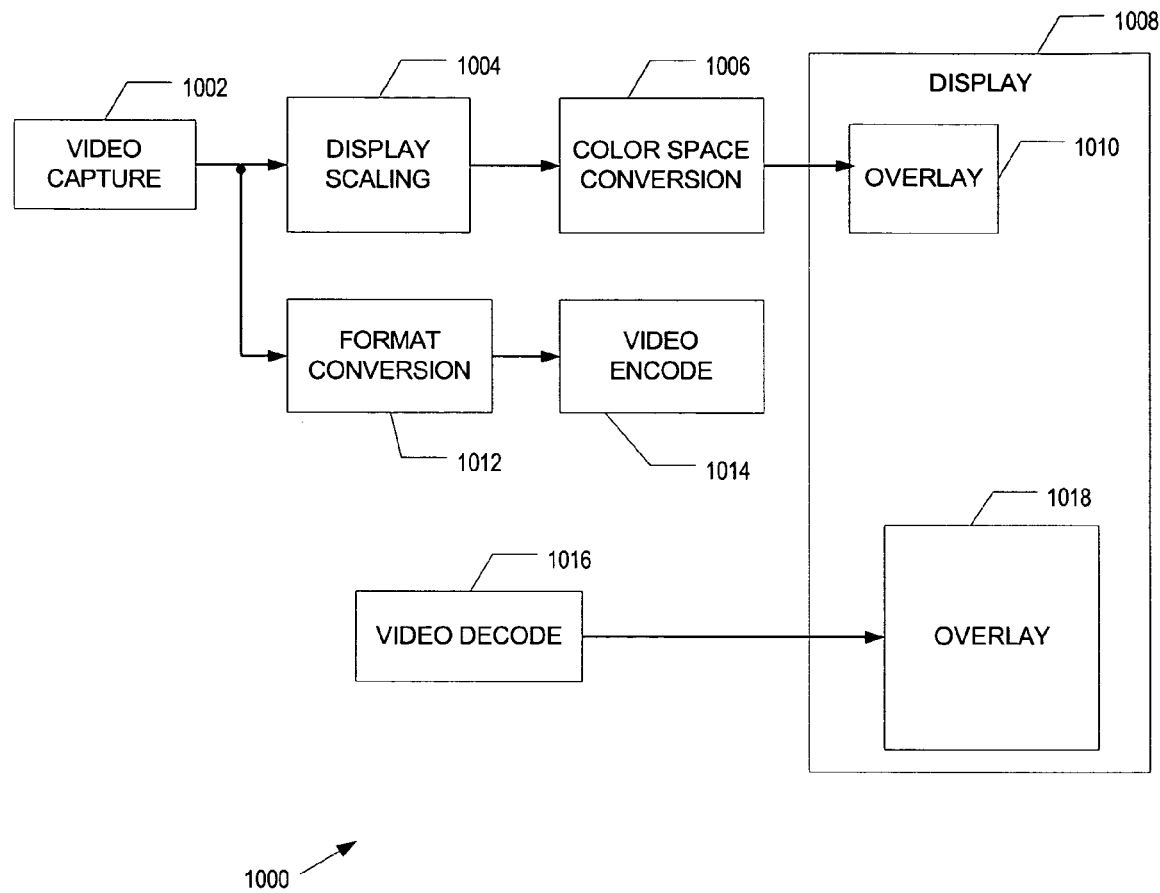
FIG. 10 illustrates an image processing system according to an embodiment of the present invention.

FIG. 10 illustrates an image processing system according to an embodiment of the present invention. Image processing system 1000 may be, for example, a video conferencing system. Images of a video conference attendee are captured, converted and/or encoded and sent to other video conference

```
@ Image Downsample using a (1,2,1) Separable Filter:, Assumes data is in range 0-254
@ Input/Output::
@      Input Image - MxN Dimensions
@          r0 → Pointer to row K of aligned image plane
@      Output Image - MxN/2 Dimensions
@          r2 → Pointer to output image
       wldrd      wR0, [r0] ,#8         @ load 8 pixels from image ROW(N)
       mov        r6, #0x00FF            @ Setup mask 0x00FF
       tbcsth     wR15 ,r6              @ Setup mask 0x00FF00FF00FF00FF
       wldrd      wR1, [r0],#8          @ load next 8 pixels from image ROW(N)
       mov        r4, #N                @ Setup Inner Loop Count
Loop:
       waligni    wR2, wR0,wR1,,#1      @ Align pixels
       wavg4      wR3, wR2, wR0         @ Average seven pixel pairs
       wldrd      wR0, [r0] ,#8         @ Load next eight pixels
       waligni    wR2, wR1,wR0,,#2      @ Align pixels
       wavg4      wR4, wR2, wR1         @ Average seven pixel pairs
       wldrd      wR1, [r0] ,#8         @ Load next eight pixels
       wand       wR3, wR3, wR15        @ mask off the odd averages
       wand       wR4, wR4, wR15        @ mask off the odd averages
       wpackhus   wR5,wR3,wR4           @ pack the data
       wstrd      wR5, [r1], #8         @ store the data out
       subs       r4, r4, #16           @ decrement loop count
       bne Loop
```

Figure 9:
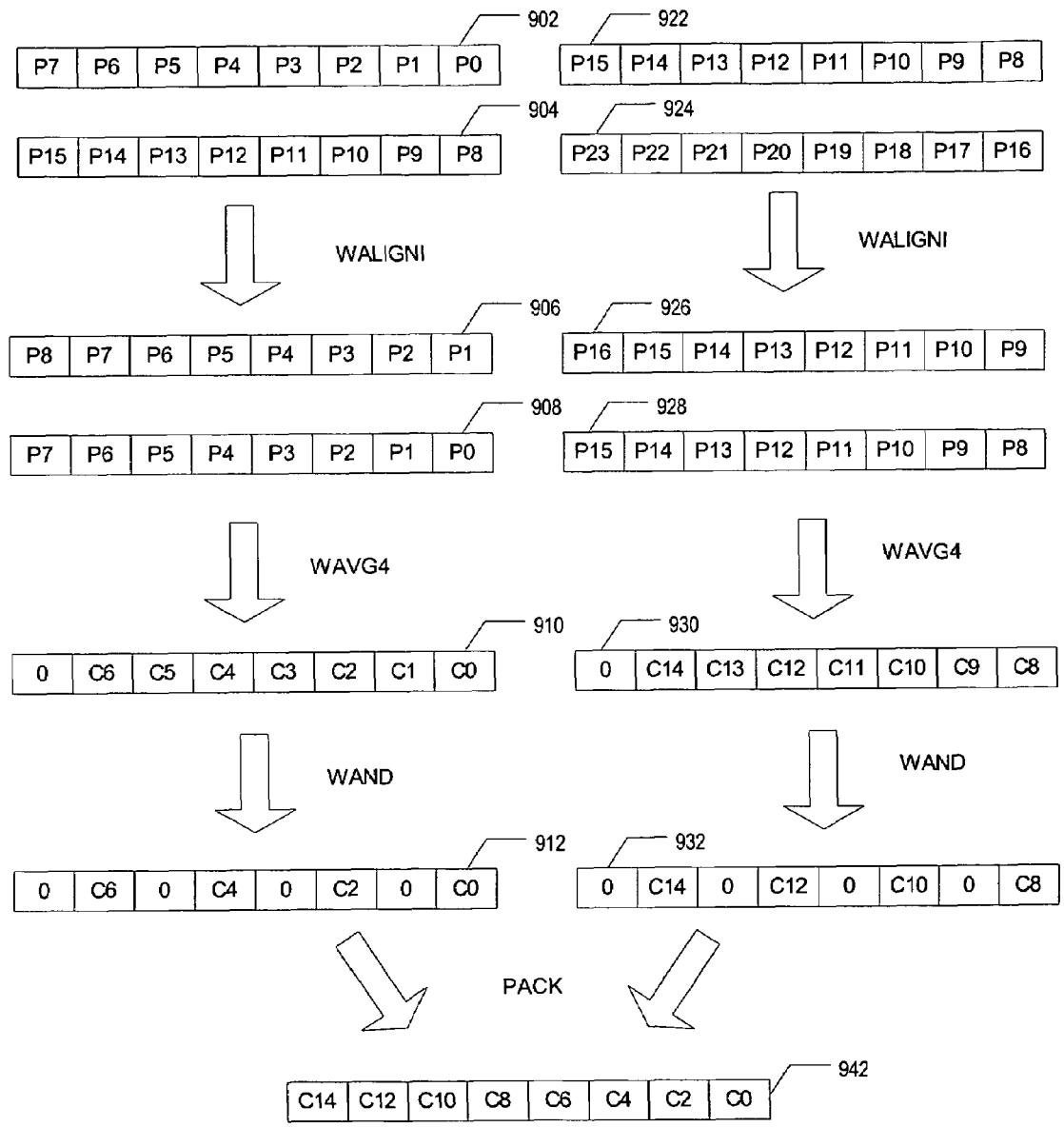
FIG. 9 illustrates another flow diagram of an image downscaling operation according to an embodiment of the present invention.

FIG. 9 illustrates a flow diagram of an image downscaling operation according to an embodiment of the present invention. Referring to the code above and FIG. 9, 32 pixels are reduced to 8 pixels. Register 902 contains a first set of pixels, P0-P7. Register 904 contains a second set of pixels, P8-P15. The pixels stored in registers 902 and 904 are aligned with an align operation (WALIGNI), resulting in pixels P1-P8 stored in register 906 and pixels P0-P7 stored in a register 908. Note that this attendees. The images of the attendee may also be displayed, for example, as a thumbnail image for viewing by the attendee. Additionally, images of other video conference attendees are received, decoded and converted for display and viewing by the attendee.

Referring to FIG. 10, video images are captured by a video capture device 1002. The video images are downscaled by a display scaling unit 1004 and optionally converted to a display format by a color space conversion unit 1006 for presentation on display 1008 as overlay 1010. Video may be captured, for example, in a YCrCb format, downscaled 2:1 or 4:1, for example, and converted to a RGB format. Display 1008 can be any type of display device. Overlay 1010 can be, for example, a thumbnail image. The video images captured by video capture device 1002 may also be converted to another format by format conversion unit 1012, and encoded by video encode unit 1014. Video encoding can include, for example, motion estimation and video compression. The encoded video images can be sent to other devices (not shown), for example a base band processor for a wireless interface. Video images received from other devices are decoded by video decode unit 1016 for presentation on display 1008 as overlay 1018.

According to one embodiment of the present invention, four-pixel averaging techniques may be employed by display scaling unit 1004 as illustrated with reference to FIG. 8 and FIG. 9.

According to another embodiment of the present invention, four-pixel averaging may be employed by format conversion unit 1012. For example, format conversion unit 1012 may convert captured video images from a YCbCr 4:4:4 format to a YCbCr 4:2:0 format, employing a downscaling operation similar to the technique described with reference to FIG. 8 and FIG. 9.

According to yet another embodiment of the present invention, video encode unit 1014 may utilize four-pixel averaging techniques when performing motion estimation. For example, when performing a block search, sub-pixel (fractional) interpolation may be performed efficiently using a four-pixel averaging operation.

According to yet another embodiment of the present invention, video decode unit 1016 may employ four-pixel average when performing motion compensation between blocks of different frames and also for sub-pixel interpolation.

Although image processing system 1000 describes the use of the four-data element averaging instruction for video image processing, image processing system 1000 may also provide still image processing.

The techniques described above may be embodied in a computer-readable medium for configuring a computing system to execute the method. The computer readable media may be permanently, removably or remotely coupled to system 101, 201 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. An apparatus comprising:
    a plurality of first adders, each first adder of the plurality of first adders operative to add two operands of a plurality of operands into one of a plurality of intermediate results;
    a plurality of second adders, each second adder of the plurality of second adders operative to add two intermediate results of the plurality of intermediate results into one of a plurality of sum results; and
    discard circuitry operative to discard the two least significant bits of each sum result of the plurality of sum results.

2. The apparatus as recited in claim 1, wherein the plurality of first adders comprises eight first adders and the plurality of second adders comprises seven second adders.

3. The apparatus as recited in claim 1, wherein the discard circuitry comprises a plurality of shift registers.

4. The apparatus as recited in claim 1, wherein each of the first adders are operative to add two eight-bit input operands producing a nine-bit intermediate operand and each of the second adders are operative to add two nine-bit intermediate operands producing a ten-bit output operand.

5. The apparatus as recited in claim 1, wherein each of the first adders are operative to add two sixteen-bit input operands producing a seventeen-bit intermediate operand and each of the second adders are operative to add two seventeen-bit intermediate operands producing an eighteen-bit operand.

6. The apparatus as recited in claim 1, wherein routing of the plurality of operands and the plurality of intermediate results to the plurality of first adders and the plurality of second adders is selected according to microcode identified by a Single-Instruction/Multiple-Data (SIMD) instruction.

7. The apparatus as recited in claim 1, wherein routing of the plurality of operands and the plurality of intermediate results to the plurality of first adders and the plurality of second adders is selected according to decode logic and a Single-Instruction/Multiple-Data (SIMD) instruction.

8. The apparatus as recited in claim 1, wherein the plurality of first adders, the plurality of second adders, and the discard circuitry form a Single-Instruction/Multiple-Data (SIMD) instruction execution circuit.

* * * * *